United States Patent Office 3,777,036
Patented Dec. 4, 1973

3,777,036
PESTICIDAL PREPARATIONS CONTAINING
CARBAMATES
Erwin Nikles, Liestal, Switzerland, assignor to Ciba-Geigy AG, Basel, Switzerland
No Drawing. Original application Sept. 9, 1968, Ser. No. 758,618, now Patent No. 3,655,730. Divided and this application Jan. 10, 1972, Ser. No. 216,762
Claims priority, application Switzerland, Sept. 14, 1967, 12,862/67
Int. Cl. A01n 9/12
U.S. Cl. 424—300    26 Claims

ABSTRACT OF THE DISCLOSURE

The invention comprises new alkenylaminophenylcarbamates and their use in preparations for combating pests, preferably insects and acarides.

---

This is a division of application Ser. No. 758,618 filed Sept. 9, 1968 now U.S. Pat. No. 3,655,730.

The present invention relates to carbamates, which are especially useful as active ingredients in pesticidal preparations.

The present invention provides compounds of the formula:

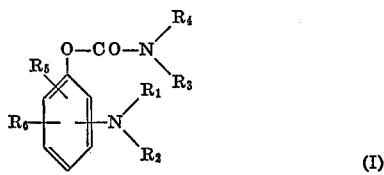

(I)

wherein the group —N($R_1$)($R_2$) is in the o-position or m-position to the carbamoyloxy group and wherein $R_1$ represents an alkenyl residue having up to 6 carbon atoms, $R_2$ represents an alkyl residue having up to 6 carbon atoms, $R_3$ and $R_4$ independently of one another represent hydrogen or an alkyl residue having up to 4 carbon atoms and $R_5$ and $R_6$ independently of one another represent hydrogen or the methyl group, and their salts.

The present invention also provides a pesticidal preparation, which comprises, as the active ingredient, a compound of the above mentioned general formula, together with a suitable carrier.

The preparation may contain one or more of the following additives: a solvent, a diluent, a dispersing agent, a wetting agent, an emulsifier, a thickener as well as further known pesticides.

The new active carbamates on which the preparations are based can be obtained by methods which are usual for the manufacture of this class of substance, for example by reaction of appropriate phenols with alkyl isocyanates or dialkyl-carbamic acid chlorides or by reaction of appropriately substituted aminophenylcarbonates or aminophenylchlorocarbonates with dialkylamines or alkylamines, for example with methylamine or methyl-alkylamines.

It is also possible to produce the alkenyl grouping in $R_1$ by known methods, for example by eliminating halogens from residues $R_1$ which contain halogens.

The active component may be present as a free base or in the salt form. Inorganic and organic acids may be used for the salt formation, for example sulphuric acid, hydrochloric acid, hydrobromic acid, phosphoric acid, sulphamic acid, citric acid, glycollic acid, ethionic acid, methanesulphonic acid, toluenesulphonic acid, p-amino-benzoic acid, maleic acid and a number of others. Acid salts, for example the acid sulphate, are especially stable.

The new carbamates according to the invention, of Formula I, exhibit exceptional biocidal properties in combating insects and pests of the order Acarina, in each case in all of their stages of development, and in combating nematodes, especially plant-parasitary nematodes.

Thus for example these carbamates are very active against houseflies, mosquitos, aphids, caterpillars and beetles, for example corn beetles and Colorado beetles. In contact action, they are greatly superior to the known active substance "Carbaryl" (N-methyl-α-naphthyl-carbamate). Their activity against Coleoptera, Rhynchota and Lepidoptera renders them an especially suitable class of compounds.

The powerful action against cockroaches, should be particularly emphasized. The new carbamates are therefore very suitable for combating pests in the hygiene field and in storage.

The new compounds and preparations, because of their wide range of biocidal action, have the particular advantage that they can be used for combating a wide variety of animal pests.

When used in a concentration where no phytotoxic phenomena arises, they also show a good action, in plant protection, against harmful micro-organisms, for example against fungi, for example *Alternaria solani*, *Phytophora infestans* and *Septoria apii*, as well as against micro-organisms, for example varieties of Aspergillus, and also against molluscs.

The compounds according to the invention, or the preparations based thereon, possess an advantageously low toxicity to warm blooded animals.

Preparations that are especially interesting are those which, as the active component, contain a carbamate of formula

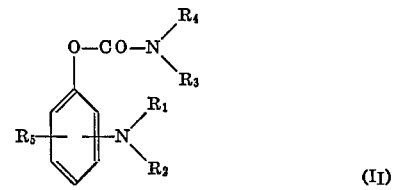

(II)

as the free base or in the form of their salts, with the group —N($R_1$)($R_1$) being in the o-position or m-position to the carbamoyloxy group and with $R_1$ representing an alkenyl residue having up to 6 carbon atoms, $R_2$ representing an alkyl residue having up to 6 carbon atoms, $R_3$ and $R_4$ independently of one another representing hydrogen or the methyl or ethyl group and $R_5$ representing hydrogen or the methyl group.

Amongst these, compounds of special interest are those of formula

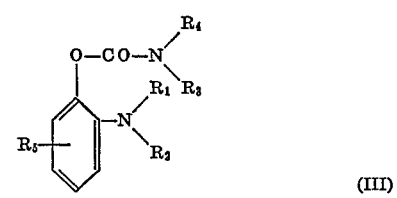

(III)

as the free base or in the form of their salts, wherein $R_1$ represents an alkenyl residue with up to 6 carbon atoms, $R_2$ represents an alkyl residue with up to 6 carbon atoms, $R_3$ and $R_5$ represent hydrogen or the methyl group and $R_4$ represents the methyl group or the ethyl group.

Amongst these, those compounds should be especially mentioned, as active substances, which possess the Formula IV

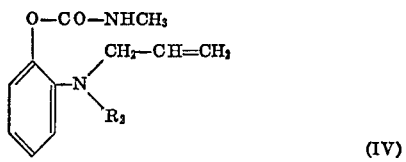

(IV)

which can be used as the free base or in the form of their salts and wherein $R_2$ represents an alkyl residue having up to 6 carbon atoms.

As a further sub-group, those active substances have proved of value which are encompassed by the formula

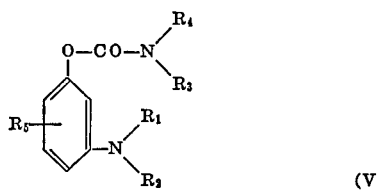

(V)

wherein $R_1$ represents an alkenyl residue with up to 6 carbon atoms, $R_2$ represents an alkyl residue with up to 6 carbon atoms, $R_3$ and $R_5$ represent hydrogen or the methyl group and $R_4$ represents the methyl group or the ethyl group and in fact as the free base or in the form of their salts.

The following compounds of the sub-group encompassed by the Formula VI

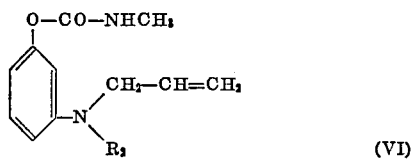

(VI)

wherein $R_2$ represents an alkyl residue with up to 6 carbon atoms are active against special pests; they may be used as free bases or in the form of their salts.

All these comopunds, which have been mentioned show, by themselves or in the form of pesticidal preparations, a high contact action and ingested poison action against hexapodes and arachnoids, above all against harmful Lepidoptera, Coleoptera, hymenoptera and rynchota and other orders of insects which are known as important pests in plant protection.

The outstanding action of the compounds of Formula I against pests and vermin in animal hygiene and public hygiene should furthermore be emphasised. For example, 2 - (methyl-allyl-amino)-phenyl-N-methylcarbamate, 2- (ethyl-allyl-amino)-phenyl-N-methylcarbamate, 2 - (isopropyl-allyl-amino)-phenyl-N-methylcarbamate and 3- (isopropyl-allyl-amino)-phenyl - N-methylcarbamate are highly active against cockroaches for example Phyllodromia germanica, Periplaneta americana and Blatta orientalis, against bugs for example Rhodnius prolixus or Cimex lectularius, mosquitos for example Aedes aegypti or Anopheles stephensi, parasitary mites for example Dermanyssus gallinae and ticks for example Boophilus microplus and Amblyomma variegatum. It is however the contact action against pests for example Musea, Locusta, Orgyia. Epilachna and others, which is particularly pronounced. In the form of their salts, especially the acid sulphates, the preparations are suitable for use as active components in bait mixtures for combating flies.

The active substances of general Formula I show, in addition to these specific contact actions, very strong ingested poison activities. Their broad action spectrum makes them above all suitable for combating pests in the following cultures: cotton, rice, maize, stone fruit and kernel fruit and lucerne. They encompass the Lepidoptera, Coleoptera, rhynchota and Hymenoptera which become especially dangerous to the above cultures. The excellent action against noctuid larvae, for example Prodenia litura and Produenia ornithogalli and proboscis beetles, for example Anthonomus grandis which occur on cotton and other cultres, should also be specially emphasised.

The new compounds and preparations can be used in many different ways and in various forms, for example in the form of sprays, dusting powders, so-called fly plates or strips impregnated with a solution of the active substances.

Suitable materials for the manufacture of directly sprayable solutions of the compounds of general Formula I are, for example, mineral oil fractions of high to medium boiling range, for example, diesel oil or kerosene, coal tar oil and oils of vegetable or animal origin as well as hydrocarbons, for example alkylated naphthalenes or tetrahydronaphthalene optionally using xylene mixtures, cyclohexanols, ketones and furthermore chlorinated hydrocarbons, for example trichlorethane and tetrachlorethane, trichlorethylene or trichlorobenzene and tetrachlorobenzenes. Organic solvents having boiling points above 100% C. are advantageously used.

It is especially appropriate to prepare aqueous application forms from emulsion concentrates, pastes or wettable spraying powders by adding water. As emulsifiers or dispersing agents there may be used non-ionic products, for example condensation products of aliphatic alcohols, amines or carboxylic acids having a long chain hydrocarbon residue of about 10 to 20 carbon atoms with ethylene oxide, for example the condensation product of octadecyl alcohol and 25 to 30 mols of ethylene oxide or that of technical oleylamine and 15 mols of ethylene oxide or that of dodecylmercaptan and 12 mols of ethylene oxide. Amongst the anionic emulsifiers which may be used there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids or the sodium salt of a petroleum-sulphonic acid. Examples of cationic dispersing agents that may be used are quaternary ammonium compounds, for example cetyl pyridinium bromide or dihydroxyethylbenzyldodecylammonium chloride.

In order to manufacture dusting agents and scattering agents, talc, kaolin, bentonite, calcium carbonate, calcium phosphate, and also charcoal, cork powder, wood flour and other materials of vegetable origin, may be employed as solid carriers. It is also very advantageous to manufacture the preparations in a granular form. The various preparations may, in the usual manner, contain addition of substances which improve the distribution, adhesion, rain resistance or penetrating power; fatty acids, resin, glue, casein or alginates may be mentioned as such substances.

The compounds and preparations according to the invention may be used by themselves or together with conventional pesticides, especially insecticides, acaricides, nematocides, bactericides or fungicides.

The following examples illustrate the invention, the parts being by weight.

EXAMPLE 1

2-(allyl-methyl-amino)-phenol

A mixture of 24.6 parts of 2-methylamino-phenol, 40 parts of sodium bicarbonate and 200 parts by volume of dimethylsulphoxide is treated, drop by drop, with 25 parts of allyl bromide, whilst stirring. The suspension is stirred for 14 hours at 50° C., and is then diluted with 1000 parts by volume of water. The product is extracted twice each time with 300 parts by volume of toluene. The solvent is evaporated and the residue distilled. Boiling point 62° C./0.2 mm. Hg.

2-(allyl-methyl-amino)-phenyl-N-methylcarbamate
[Compound No. 1]

20 parts of 2-(allyl-methyl-amino)-phenol and 0.2 part of triethylene diamine are dissolved in 150 parts by volume of dry toluene, and 9 parts of methyl isocyanate are added drop by drop. The temperature of the mixture is kept below 35° C., by cooling. After standing for 14 hours at 30–35° C., the solution is evaporated. 27 parts of 2-(allyl-methyl-amino)-phenyl-N-methylcarbamate are obtained as an oil. $n_D^{22}=1.536$. [Rat toxicity (oral) $LD_{50}$: 115 mg./kg.]. NMR-spectrum: δ-values [$CDCl_3$/TMS]:

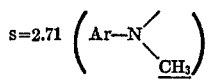

d=2.79 (J=5) (—CO—NH—CH$_3$); integral of the two signals together =6 H;

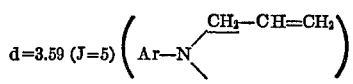

m=4.9–5.4 (—CH$_2$—CH=CH$_2$ and —CO—NH—CH$_3$);
m=5.5–6.2 (—CH$_2$—CH=CH$_2$); m=6.7–7.3 (Ar—H).

Acid sulphate 2.2 parts of 2-(allyl-methyl-amino)-phenyl-N-methylcarbamate are stirred with 10 parts of 10% strength sulphuric acid. After a short time, a clear aqueous solution of the acid sulphate is obtained.

EXAMPLE 2

(A) 2-isopropylamino-phenol

A mixture of 452 parts of 2-aminophenol, 600 parts of calcined soda, 492 parts of isopropyl bromide and 100 parts by volume of dimethylsulphoxide is stirred for 20 hours at 85° C. After dilution with 4000 parts of water, the product is extracted with toluene. The toluene solution is evaporated and the residue crystallised from ethyl acetate/petroleum ether. Melting point 98–99° C. Yield 330 parts.

(B) 2-(allyl-isopropyl-amino)-phenol 42.5 parts of allyl chloride are added during 20 minutes, while stirring, to a mixture of 75.5 parts of 2-isopropylamino-phenol, 42 parts of potassium iodide, 59 parts of 2,6-lutidine and 100 parts by volume of dimethylformamide, heated to 60° C. During this, the temperature rises to 90° C. The mixture is kept for 1½ hours at this temperature, subsequently cooled, diluted with 1000 parts by volume of wtaer and extracted with toluene. The toluene solution is dried and concentrated in vacuo. Oily 2-(allyl-isopropylamino)-phenol is obtained as the residue.

(C) 2-(allyl-isopropyl-amino)-phenyl-N-methylcarbamate [Compound No. 2]

91 parts of 2-(allyl-isopropyl-amino)-phenol are dissolved in 180 parts by volume of carbon tetrachloride and reacted with 30 parts of methyl isocyanate in the presence of 0.3 part of triethylene diamine, during 14 hours at a temperature of 35° C. The solution is evaporated, and the residue crystallised from cyclohexane and from toluenehexane. Melting point 64–65° C.

EXAMPLE 3

(A) 2-(methallyl-methyl-amino)-phenol 2-methylamino-phenol is reacted with methallyl chloride in an analogous manner to that described in Example 2 (A).

(B) 2-methallyl-methyl-amino)-phenyl-N-methylcarbamate [Compound No. 3]

153 parts of 2-(methallyl-methyl-amino)-phenol dissolved in 200 parts by volume of carbon tetrachloride are reacted with 57 parts of methyl isocyanate, in the presence of 0.3 part of triethylene diamine for 14 hours at 35° C. The solution is evaporated, and the resulting viscous oil is dried at 40° C. in a high vacuum. NMR-spectrum: δ-values [$CDCl_3$/TMS]:

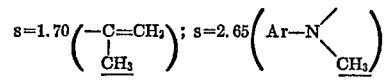

d=2.72 (J=5) (—CO—NH—CH$_3$).

The last two signals give an integral of 6 H.

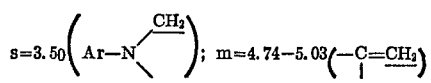

b=5.0–5.6 (—CO—NH—CH$_3$); m=6.7–7.3 (Ar—H).

EXAMPLE 4

2-(crotyl-methyl-amino)-phenol 2-methylamino-phenol is reacted with crotyl bromide in a manner analogous to that described in Example (B). The crude product is purified by distillation Boiling point 50° C./0.01 mm. Hg.

2-(crotyl-methyl-amino)-phenyl-N-methylcarbamate [Compound No. 4]

2-(crotyl-methyl-amino)-phenol is reacted with methyl isocyanate analogously to the description in Example 1. The product is obtained as a viscous oil. Boiling point 114° C./0.16 mm. Hg.

EXAMPLE 5

(A) 3-isopropylamino-phenol

A mixture of 452 parts of 3-aminophenol, 600 parts of calcined soda, 492 parts of isopropyl bromide and 100 parts by volume of dimethylsulphoxide is stirred for 20 hours at 85° C. After dilution with 4000 parts of water, the product is extracted with toluene. The toluene solution is concentrated and the final product crystallised out by adding cyclohexane. Melting point 98–100° C.

(B) 3-allyl-isopropylamino) - phenol is manufactured by reaction of 3-isopropylamino-phenol with allyl chloride similarly to the description in Example 2(B).

(C) 3-(allyl-isopropyl-amino)-phenyl-N-methylcarbamate [Compound No. 5]

91 parts of crude 3-(allyl-isopropyl-amino)-phenol are dissolved in 500 parts by volume of carbon tetrachloride and reacted with 30 parts of methyl isocyanate in the presence of 0.3 part of triethylene diamine for 14 hours, at 35° C. The solution is evaporated, and the residue crystallised from methanol-water. Melting point 79° C.

EXAMPLE 6

2-(allyl-methylamino)-phenyl-N,N-dimethylcarbamate [Compound No. 6]

A mixture of 81.5 parts of 2-(allyl-methyl-amino)-phenol, 400 parts by volume of dioxane, 58.6 parts of triethylamine and 62.5 parts of dimethylcarbamic acid chloride is stirred for 50 hours, at 90° C. The resulting triethylamine hydrochloride is filtered off after cooling to 5° C. The filtrate is evaporated in vacuo. The residue is dissolved in 500 parts by volume of ether and washed four times with 100 parts by volume of ice-cold 10% strength sodium hydroxide solution, and then with water. The ethereal solution is dried over anhydrous sodium sulphate, filtered and evaporated. The oily product is dried whilst stirring at 40° C. in a high vacuum. NMR-spectrum: δ-value [CDCl₃/TMS]:

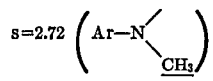

s=2.72 (Ar—N⟨CH₃⟩)

s=3.05 (—CO—N(CH₃)₂);

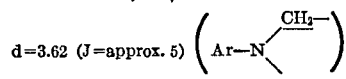

d=3.62 (J=approx. 5) (Ar—N⟨CH₂—⟩)

m=5.0–6.2 (—CH=CH₂); m=6.8–7.3 (Ar—H).

The following compounds are manufactured analogously to the descriptions in Examples 1–6:

(7) 2-(allyl-ethyl-amino)-phenyl-N-methylcarbamate, boiling point 72° C./0.2 mm. Hg.
(8) 2-(allyl-n-propyl-amino)-phenyl-N-methylcarbamate, boiling point 89° C./0.18 mm. Hg.
(9) 2-(1-buten-3-yl-methyl-amino)-phenyl-N-methylcarbamate, (NMR-spectrum),
(10) 3-(allyl-methyl-amino)-phenyl-N-methylcarbamate, boiling point 76° C./0.4 mm. Hg.
(11) 3-(allyl-ethyl-amino)-phenyl-N-methylcarbamate, oil
(12) 3-(allyl-n-propyl-amino)-phenyl-N-methylcarbamate, viscous oil,
(13) 3-(1-buten-3-yl-methyl-amino)-phenyl-N-methylcarbamate, (NMR-spectrum),
(14) 2-(1-buten-3-yl-ethyl-amino)-phenyl-N-methylcarbamate, oil
(15) 2-(allyl-ethyl-amino)-phenyl-N,N-dimethylcarbamate, (NRM-spectrum)
(16) 2-(allyl-sec.butyl-amino)-phenyl-N-methylcarbamate, boiling point 54° C./0.01 mm. Hg
(17) 2-(methallyl-ethylamino)-phenyl-N-methylcarbamate,
(18) 2-(methallyl-isopropylamino)-phenyl-N-methylcarbamate,
(19) 3-(methallyl-isopropylamino)-phenyl-N-methylcarbamate,
(20) 3-(methallyl-methylamino)-phenyl-N-methylcarbamate,
(21) 2-(crotyl-isopropylamino)-phenyl-N-methylcarbamate,
(22) 3-(crotyl-methylamino)-phenyl-N-methylcarbamate,
(23) 3-allyl-methylamino)-phenyl-N,N-dimethylcarbamate,
(24) 2-(allyl-methylamino)-phenyl-N-ethylcarbamate,
(25) 3-(allyl-methylamino)-phenyl-N-ethylcarbamate,
(26) 2-(allyl-isopropylamino)-phenyl-N-ethylcarbamate,
(27) 3-(allyl-isopropylamino)-phenyl-N-ethylcarbamate,
(28) 2-(allyl-methylamino)-4-methylphenyl-N-methylcarbamate,
(29) 2-(allyl-methylamino)-4,6-dimethylphenyl-N-methylcarbamate,
(30) 2-(crotyl-methylamino)-4-methylphenyl-N-methylcarbamate,
(31) 2-(crotyl-methylamino)-4,6-dimethylphenyl-N-methylcarbamate,
(32) 2-(2-pentene-2-methyl-4-yl-methylamino)-phenyl-N-methylcarbamate, oil.

EXAMPLE 7

Wettable powder

In order to manufacture a spraying powder, the following components are, for example, mixed and finely ground: 50 parts of active substance of one of compounds 1–32, 20 parts of Hisil (highly adsorptively filled silica), 25 parts of bolus (kaolin), 3–5 parts of a reaction product of p-tert. octylphenol and ethylene oxide, and 15 parts of sodium 1-benzyl-2-stearyl-benzimidazole-6.3'-disulphonate.

Emulsion concentrate

Easily soluble active substances can also be formulated as emulsion concentrates according to the following prescription: 20 parts of active substance, 70 parts of xylene and 10 parts of a mixture of a reaction product of an alkylphenol with ethylene oxide and calcium dodecylbenzenesulphonate are mixed. On dilution with water to the desired concentration, a sprayable emulsion is produced.

EXAMPLE 8

In order to test their action against various storage pests, 2 g. of active substance according to Example 1 were mixed with 39 g. of talc and the whole very finely ground. A dusting powder possessing good activity is thus obtained.

The following results were obtained with this powder:

| Test animals | Limiting concentration for 100% mortality in 24 hours exposure time, mg. of active substance per m.² | |
|---|---|---|
| | Compound No. 1 | Compound No. 2 |
| German cockroach (*Phyllodromia germanica*) | 25 | 6 |
| American cockroach (*Periplantea americana*) | 3 | 6 |
| Russian cockroach (*Blatta orientalis*) | 12 | 3 |
| (*Dermestes frischii*) (imago) | 200 | >200 |
| (*Dermestes frischii*) (larva) | 100 | 50 |
| Corn beetle (*Sitophilus granarius*) | | 50 |
| Domestic cricket (*Acheta domestica*) | 50 | 25 |

EXAMPLE 9

Action against female mosquitos (*Aedes aegypti*)

Female mosquitos are exposed for 6 hours to a coating of the substance to be tested, in Petri dishes of 11 cm. diameter. In order to manufacture this coating, the bottom of the dish is first treated with 7 ml. of an acetone solution of the substance and dried for 1 hour. Solutions containing 1000, 100, 10 and 1 p.p.m. are used, corresponding to a concentration of 1, 0.1, 0.01 and 0.001 mg./dish. The mosquitos are cooled in ice and 10 females are counted off into each of the dishes. 4 repeats were run per concentration.

The following percentage mortalities were achieved with 3 active substances:

| Compound number | Mg./dish | Percent after— | | |
|---|---|---|---|---|
| | | 45 minutes | 90 minutes | 360 minutes |
| 1 | 0.01 | 100 | | |
| 1 | 0.001 | | | 100 |
| 2 | 0.01 | | 100 | |
| 5 | 1 | | 100 | |
| 5 | 0.01 | | 95 | |

Compound No. 1, used in the same manner against *Anopheles stephensi*, produced 100% mortality after 45 minutes at concentrations of 0.001 mg./dish.

EXAMPLE 10

Action against bugs (A) *Rhodnius prolixus*.—Acetone solutions of active substances were applied in Petri dishes of 11 cm. diameter, as described in Example 9, in such a way that concentrations of 1 mg., 0.01 mg. and 0.001 mg. per dish were provided (1 mg. per dish corresponds to 1 g. per 9.4 m.²). After 1 hour's drying of the prepared dishes, 10 bugs in the L₃-stage were exposed to the active substance coating for 24 hours. The action was tested after 45 minutes, 90 minutes, 3 hours, 6 hours and 24 hours.

Single repeat with new dilution series.
The following mortalities were achieved:

| Compound number | Mg./dish | Percent after— 45 minutes | 90 minutes |
|---|---|---|---|
| 1 | 0.01 | 100 | --- |
| 2 | 1 | --- | 100 |
| 2 | 0.01 | --- | 95 |

Compound Nos. 3, 4, 5, 7, 15–19 and 22 show a similar action.

(B) *Cimex lectularius* (bedbug).—In a similar test, in which the active substance is used on filter paper in plastic dishes (1 mg. per dish corresponds to 1 g. per 6 m.²) and in which 2 repeats are run with 10 bugs each 100% mortality results for active substance No. 1 at a concentration of 1 mg./dish after 90 minutes.

EXAMPLE 11

Action against Acarina (A) *Rhipicephalus bursa*.—5 adult hungry ticks are counted into a glass test tube and dipped for 1–2 minutes into 2 ml. of an aqueous emulsion containing 100 p.p.m. of test substance. The test tube is then closed with a standard cotton wool swab and inverted so that the active substance emulsion is taken up by the cotton wool. Evaluation takes place after 1 and 2 weeks.

2 repeats are run for each experiment. Compound No. 1 resulted in 100% mortality after 2 weeks. Compound No. 2 resulted in 100% mortality after 1 week.

Using a special dilution series of 100, 10, 1 and 0.1 p.p.m., the same experiment was repeated with Compound No. 2. 100% mortality was already ascertained after 24 hours at a concentration of 1 p.p.m.

(B) *Amblyomma variegatum*.—A test series and two repeats with 5 unfed females at a time are carried out with the dilution series mentioned. Compound No. 1 resulted in 100% mortality after 2 weeks.

(C) *Boophilus microplus* (larvae).—Test method as mentioned under (B) but the 10–20 larvae were not counted out accurately. After 2 weeks Compound No. 1 resulted in 100% mortality. Similar results are achieved with Compounds 2 to 8, 11, 12, 19 and 22.

EXAMPLE 12

Action against *Musca domestica* (L.)

(A) Contact action.—1 half at a time of a Petri dish was treated with 1 ml. respectively of an acetone solution of one of the substances Nos. 1 and 2, containing 1000, 100, 10 and 5 p.p.m. of the active substance. After evaporation of the solvent, houseflies inactivated by cooling were introduced into the prepared Petri dishes and the lid halves were applied. Each dish contained 10 experimental flies. After increasing time intervals, the percentage mortality was checked at the various concentrations.

| Compound number | Concentration, p.p.m. | Percent after— 4 hours | 2 hours |
|---|---|---|---|
| 1 | 1,000 | 100 | — |
|  | 100 | 100 | — |
|  | 10 | 100 | — |
|  | 5 | — | — |
| 2 | 1,000 | 100 | 100 |
|  | 100 | 100 | 100 |
|  | 10 | 100 | 100 |
|  | 5 | 100 | 100 |

—=Not tested.

(B) Ingestion action.—In order to carry out the ingestion test on houseflies, samples of a saturated sugar solution containing the emulsified action substance No. 1 were prepared in such a way as to result in two concentrations of 3333 p.p.m. and 1111 p.p.m. These 2 concentrations were then dabbed by means of a glass rod, using 3 drops in each case, onto the inner surface of the upper Petri half-dish. 10 freshly emerged unfed flies were introduced, inactivated by cooling, into the lower half of a dish and covered with the lid half which contained the preparation to be tested.

After 4 hours, the percentage mortality was as follows: 100% at 3333 p.p.m., and 50% at 1111 p.p.m.

EXAMPLE 13

Larvae test with *Orgyia gonostigma* and *Epilachna varivestis*

Potted young mallow plants (*Malva sylvestris*) having approximately 6 leaves are dipped into an active substance solution of a certain concentration and allowed to dry. Thereafter a cellophane hood containing 5 larvae of *Orgyia gonostigma* in the $L_3$-stage is placed over each plant and fixed with a rubber band. The insecticidal ingestion action and contact action is tested 2 days later and 5 days later. If 100% mortality is found the first time, the plant is re-infested so that in this case the possible ageing of the active substance is simultaneously included.

A similar test is carried out with a Mexican bean beetle, *Epilachna varivestis*, in the $L_4$-larvae stage, using phaseolus as the host plant.

The following results were achieved by appropriate dilution series of an active substance:

| Compound number | Concentration in p.p.m. | Larvae | Percentage mortalities after— 2 days | 5 days |
|---|---|---|---|---|
| 1 | 800 | Orgyia | 80 | 100 |
|  | 400 |  | 80 | 100 |
| 2 | 800 | Orgyia | 100 | --- |
|  | 400 |  | 60 | 100 |
|  | 200 |  | 60 | 100 |
| 1 | 800 | Epilachna | 80 | 100 |
|  | 400 |  | 80 | 100 |
|  | 200 |  | 0 | 100 |
|  | 100 |  | 0 | 100 |
| 2 | 800 | Epilachna | 80 | 100 |
|  | 400 |  | 60 | 100 |
|  | 200 |  | 0 | 100 |
|  | 100 |  | 0 | 80 |

EXAMPLE 14

Action against *Aphis fabae* (contact and long-term action)

Young *Vicia faba* plants of about 6 cm. height are infested by means of parts of plants attacked by *Aphis fabae*. After 5 days, the starting conditions for the active substance test exist as a result of further growth of the plants and correspondingly great increase in the number of aphids. For the *contact test* the attacked plant is sprayed from all sides by means of a chromatography atomiser containing a certain active substance concentration starting at 800 p.p.m. The action is ascertained after 2 days.

The following result was achieved with a dilution series of Compounds Nos. 1 and 2.

| Compound number | Concentration in p.p.m. | Mortality after 2 days (percent) |
|---|---|---|
| 1 | 800 | 100 |
|  | 400 | 100 |
|  | 200 | 100 |
|  | 100 | 100 |
| 2 | 800 | 100 |
|  | 400 | 100 |
|  | 200 | 100 |
|  | 100 | 100 |

For the *penetration test*, the attacked plant is sprayed vertically from above so that whilst the active substance strikes the upper face of the leaf, the aphids sitting on the lower face are on the other hand not subjected to direct contact. This experiment, which is independent of the contact test, resulted in the following action for a dilution series of Compound 2 after 2 days.

| Concentration in p.p.m.: | Mortality (percent) |
|---|---|
| 800 | 100 |
| 400 | 100 |
| 200 | 100 |
| 100 | 80 |

EXAMPLE 15

Action against pests in the cultivation of fruit (A) Young apple trees showing the normal attack by pests were sprayed a few days before flowering ($E_2$-stage) with appropriately diluted solutions of active substances. After an average of 4 to 10 days, 200 blossoms per tree were selected and the number of killed creatures was counted on these. The activity is determined by comparison with a number of living pests on untreated trees. The following results, obtained from the end of April to the beginning of May, are represented in the table.

Compound No. 1 gave the following percentage mortality at a concentration of 400 p.p.m.:

| Pest | Order | Time interval | Mortality, percent | Control percent |
|---|---|---|---|---|
| Psylla mali | Rhynchota | 5 days | 98 | 5 |
| Cheimatobia brumata L. | Lepidoptera | 9 days | 98 | 22 |
| Chloroclystic rectangulata L. | do | 9 days | 98 | 22 |

(B) In a special experiment of *Chimatobia brumata* L. larvae 3 groups at a time for each of 3 artificially infested apple trees, were selected. After the larvae had half developed, spraying was effected with concentrations of 400 p.p.m. of active substance. After 6 days the results were evaluated as described under (A), with 100% mortality resulting after application of compound No. 1.

(C) Contact test.—In 3 parallel determinations, 10 larvae at a time of *Aporia crataegi* (Lepidoptera, Pieridae) in the $L_3$-stage to $L_4$-stage were dipped into an aqueous solution containing 400 p.pm. of active substance and introduced into glass vessels together with fresh leaves of plum trees (Prunus) as food.

In a time test in which the mortality was checked after 6, 24, 48, 72 and 96 hours, compound No. 1 resulted in 100% mortality after 6 hours.

(D) Ingestion test.—In 3 parallel determinations, 20 caterpillars at a time of clothes moths (Hyponomeutidae) were introduced into glass vessels together with plum leaves (Prunus) as food, these leaves having initially been sprayed with a dilute active substance solution of compound No. 1. The following mortality as a function of time resulted:

| Concentration in p.p.m. | Percent | | | | |
|---|---|---|---|---|---|
| | 2 hrs. | 4 hrs. | 8 hrs. | 24 hrs. | 48 hrs. |
| 500 | 40 | 45 | 90 | 90 | 100 |
| 250 | 0 | 5 | 5 | 60 | 85 |

EXAMPLE 16

Contact test against pests in alfalfa cultures.—In 3 parallel determinations, 10 adults at a time of *Phytodecta fornicata* Brüggem, (Coleoptera, Chrysomelidae) were briefly dipped into an aqueous solution containing 400 p.p.m. of active substance and placed on fresh food (alfalfa). The action of compound No. 1 in a time test checked after 6, 24, 48 and 72 hours already resulted in 100% mortality after 6 hours.

EXAMPLE 17

Action against cotton pests.—Potted young cotton plants in the 7-leaf stage are dipped into an aqueous solution containing 200 p.p.m. of active substance of Compound No. 1 in such a way that the soil surface which is additionally protected by a cover does not come into contact with the active substance solution. After drying, 5 individuals of *Anthonomus grandis* ("boll weevil") were placed on each plant. After 5 days, 95% mortality resulted.

EXAMPLE 18

Action against rice stem borers (*Chilo suppressalis*).— Using Compound No. 1 at a concentration of 200 p.p.m. for impregnating a germinated rice root mazl $L_3$-larvae introduced therein were 100% killed after 48 hours as a result of *ingestion* action and *contact* action.

I claim:

1. A composition for combatting pests selected from the group consisting of insects and acarinae comprising (1) a pesticidally effective amount of a compound of the formula

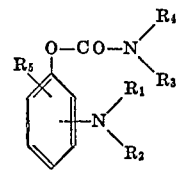

as the free base or in the form of its acid addition salts, wherein the group $-N(R_1)(R_2)$ is in the o-position or m-position to the carbamoyloxy group and wherein $R_1$ represents alkenyl of from 2 to 6 carbon atoms, $R_2$ represents alkyl of from 1 to 6 carbon atoms, each of $R_3$ and $R_4$ represents hydrogen or alkyl of from 1 to 4 carbon atoms, and $R_5$ represents hydrogen or methyl, and (2) a suitable carrier.

2. A method for combatting pests selected from the group consisting of insects and acarinae comprising applying to said pests a pesticidally effective amount of a compound of the formula

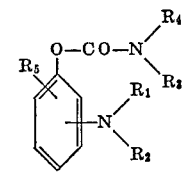

as the free base or in the form of its acid addition salts, wherein the group $-N(R_1)(R_2)$ is in the o-position or m-position to the carbamoyloxy group, and wherein $R_1$ represents alkenyl of from 2 to 6 carbon atoms, $R_2$ represents alkyl of from 1 to 6 carbon atoms, each of $R_3$ and $R_4$ represents hydrogen or alkyl of from 1 to 4 carbon atoms, and $R_5$ represents hydrogen or methyl.

3. The method of claim 2 in which the pests are cockroaches, Colorado beetles or aphids.

4. The method of claim 2 in which, in the compound, each of $R_3$ and $R_4$ represents hydrogen, methyl or ethyl.

5. The method of claim 4 in which the pests are cockroaches, Colorado beetles or aphids.

6. The method of claim 4 in which the compound is of the formula

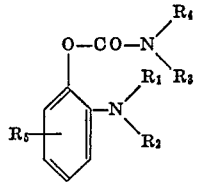

as the free base or in the form of its acid addition salts, wherein $R_1$ represents alkenyl of from 2 to 6 carbon atoms, $R_2$ represents alkyl of from 1 to 6 carbon atoms, each of $R_3$ and $R_5$ represents hydrogen or methyl, and $R_4$ represents methyl or ethyl.

7. The method of claim 6 in which the pests are cockroaches, Colorado beetles or aphids.

8. The method of claim 6 in which, in the compound, $R_1$ is allyl, $R_2$ is alkyl of from 1 to 6 carbon atoms, $R_3$ and $R_5$ are hydrogen and $R_4$ is methyl.

9. The method of claim 8 in which the pests are cockroaches, Colorado beetles or aphids.

10. The method of claim 8 in which the compound is of the formula

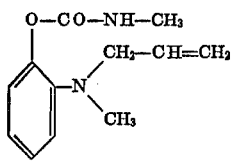

as the free base or in the form of one of its acid addition salts.

11. The method of claim 10 in which the pests are cockroaches, Colorado beetles or aphids.

12. A method for combatting cockroaches which comprises applying thereto an insecticidally effective amount of a compound of the formula

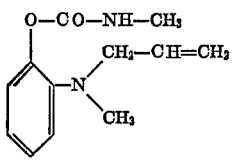

13. A method for controlling aphids which comprises applying thereto an insecticidally effective amount of a compound of the formula

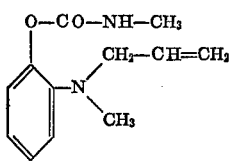

14. The method of claim 8 in which the compound is of the formula

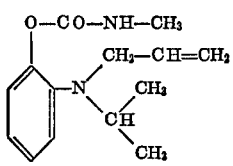

as the free base or in the form of one of its acid addition salts.

15. The method of claim 14 in which the pests are cockroaches, Colorado beetles or aphids.

16. A method for combatting cockroaches which comprises applying thereto an insecticidally effective amount of a compound of the formula

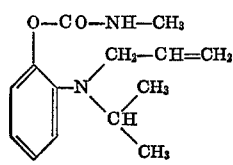

17. A method for combatting aphids which comprises applying thereto an insecticidally effective amount of a compound of the formula

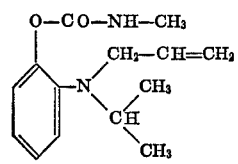

18. The method of claim 6 in which the compound is of the formula

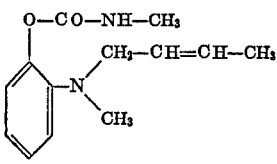

as the free base or in the form of one of its acid addition salts.

19. The method of claim 18 in which the pests are cockroaches, Colorado beetles or aphids.

20. The method of claim 4 in which the compound is of the formula

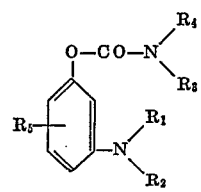

as the free base or in the form of its acid addition salts, wherein $R_1$ is alkenyl of from 2 to 6 carbon atoms, $R_2$ is alkyl of from 1 to 6 carbon atoms, each of $R_3$ and $R_5$ represents hydrogen or methyl, and $R_4$ represents methyl or ethyl.

21. The method of claim 20 in which the pests are cockroaches, Colorado beetles or aphids.

22. The method of claim 20 in which, in the compound, $R_1$ is allyl, $R_2$ represents alkyl of from 1 to 6 carbon atoms, $R_3$ and $R_5$ are hydrogen and $R_4$ is methyl.

23. The method of claim 22 in which the pests are cockroaches, Colorado beetles or aphids.

24. The method of claim 22 in which the compound is of the formula

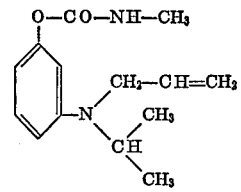

as the free base or in the form of one of its acid addition salts.

25. The method of claim 24 in which the pests are cockroaches, Colorado beetles or aphids.

26. A method for combatting cockroaches which comprises applying thereto an insecticidally effective amount of a compound of the formula

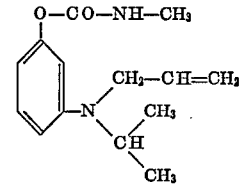

References Cited
UNITED STATES PATENTS 3,210,403 10/1965 Heiss et al. _____ 260—479
3,453,316 7/1969 Heiss et al. _____ 260—479

ALBERT T. MEYERS, Primary Examiner
F. E. WADDELL, Assistant Examiner